United States Patent [19]

Silverbrook

[11] Patent Number: 5,329,616
[45] Date of Patent: Jul. 12, 1994

[54] COMPRESSED IMAGE STORES FOR HIGH RESOLUTION COMPUTER GRAPHICS

[75] Inventor: Kia Silverbrook, Woollahra, Australia

[73] Assignees: Canon Kabushiki Kaisha, Tokyo, Japan; Canon Information Systems Research Australia Pty. Ltd., New South Wales, Australia

[21] Appl. No.: 744,703

[22] Filed: Aug. 13, 1991

[30] Foreign Application Priority Data

Aug. 16, 1990 [AU] Australia ............................. PK 1784
Aug. 16, 1990 [AU] Australia ............................. PK 1785
Nov. 19, 1990 [AU] Australia ............................. PK 3418

[51] Int. Cl.[5] ............................................. G06F 15/62
[52] U.S. Cl. ..................................... 395/164; 382/56; 395/162
[58] Field of Search ............... 395/164, 163, 162, 114; 340/798, 799; 358/133, 426; 382/56; 345/185, 201

[56] References Cited

U.S. PATENT DOCUMENTS 3,916,095 10/1975 Weber et al. ..................... 358/261.3
4,791,680 12/1988 Yokoe et al. ........................... 382/56
4,823,201 4/1989 Simon et al. ......................... 358/133
5,150,462 9/1992 Takeda et al. ....................... 395/164

FOREIGN PATENT DOCUMENTS 0132562 2/1985 European Pat. Off. .
WO89009529 10/1989 PCT Int'l Appl. .

OTHER PUBLICATIONS

Microprocessing and Microprogramming, de Sá, et al., "A Parallel Architecture for Real-Time Video Coding", vol. 30, Nos. 1/5, pp. 439-445, Aug. 1990.

Primary Examiner—Dale M. Shaw
Assistant Examiner—Kee M. Tung
Attorney, Agent, or Firm—Fitzpatrick, Cella, Harper & Scinto

[57] ABSTRACT

A graphics system is disclosed within which video graphics images are calculated via a computer and output for storage via a buffer whereby the image can be compressed/expanded for storage in compressed form in a dedicated semiconductor memory. The system also permits storage of compressed images on hard disk by directly connecting the compressed image store to a system bus. The compressed image store can be duplicated and further compression/expansion units added to broaden system versatility. Alternatively, a single compression/expansion unit can be used.

24 Claims, 13 Drawing Sheets

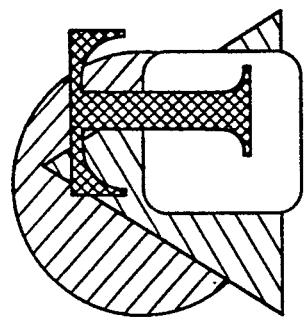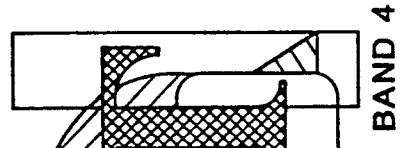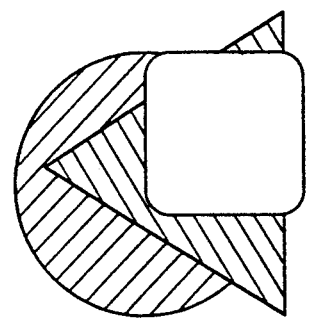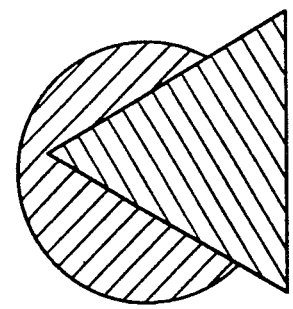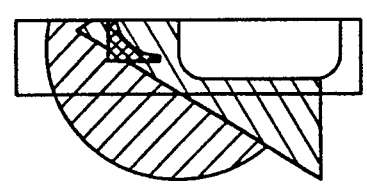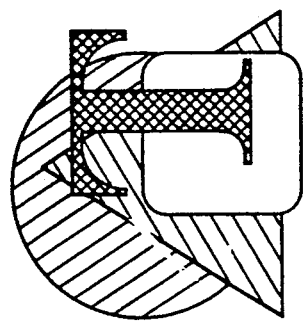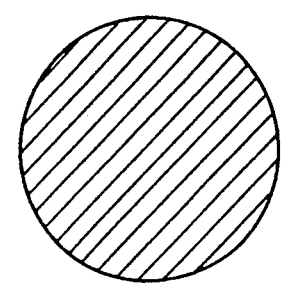

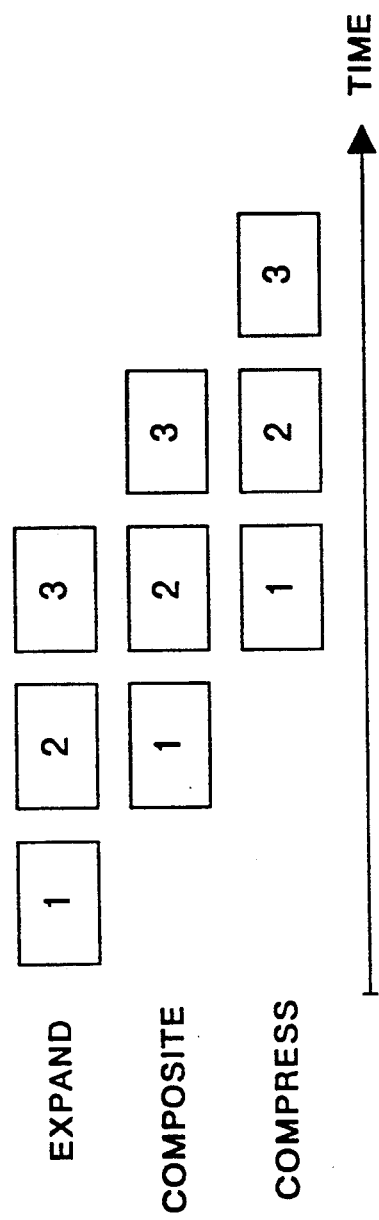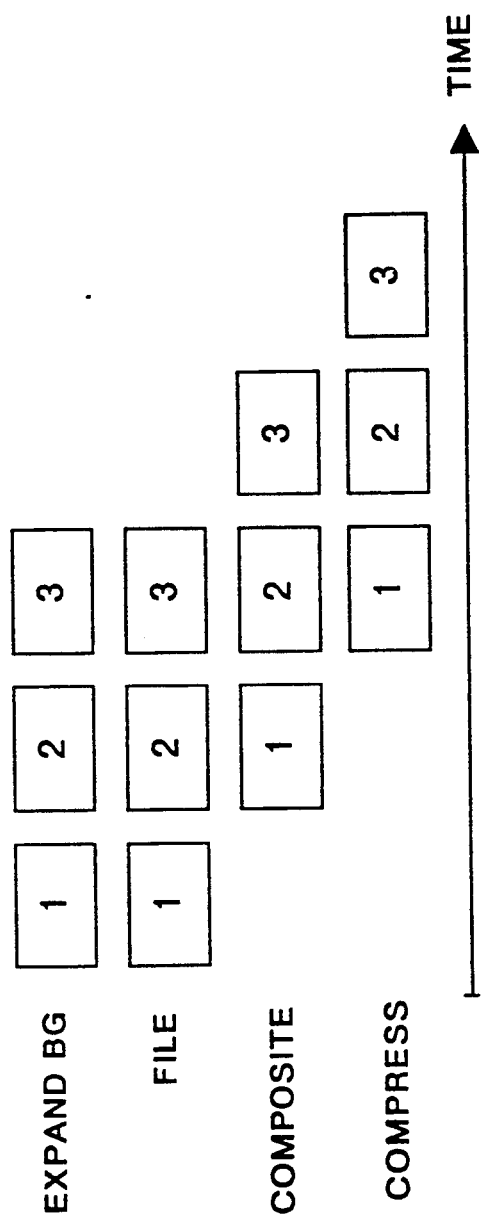
FIG. 10
FIG. 11

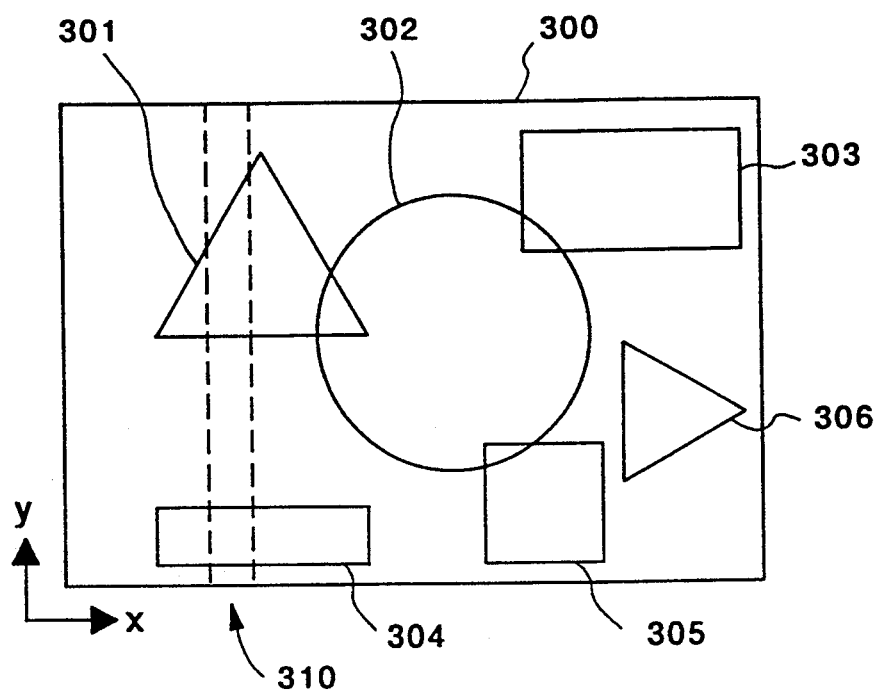
F I G. 13A
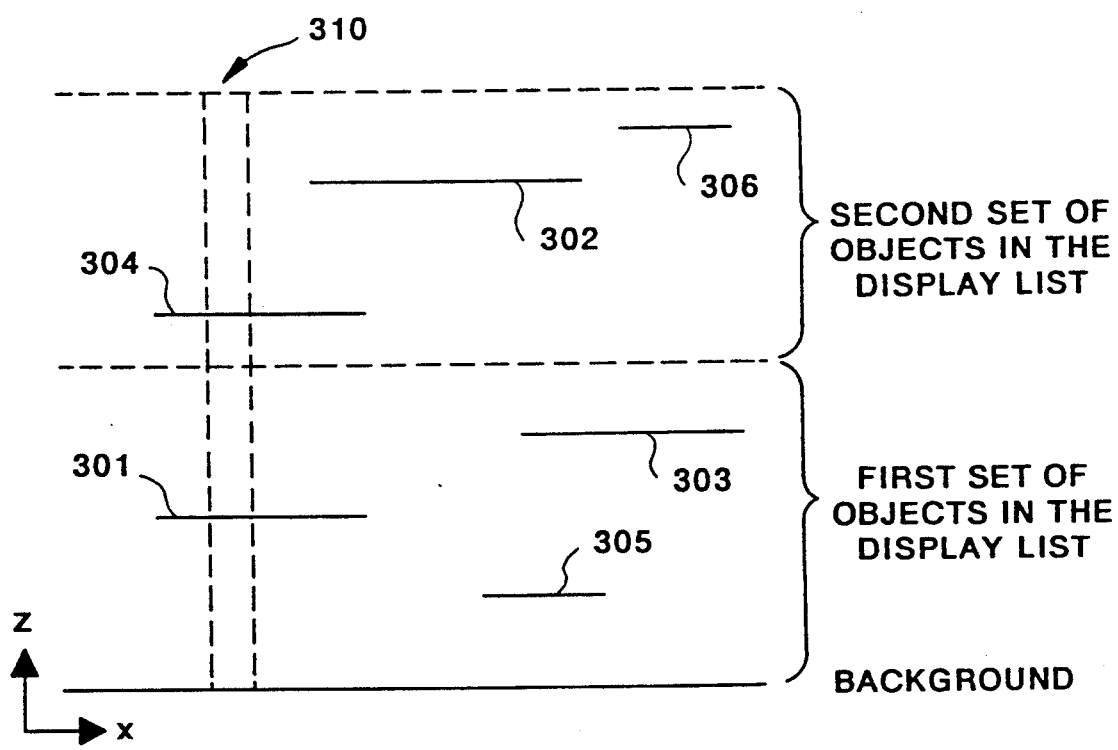
F I G. 13B

COMPRESSED IMAGE STORES FOR HIGH RESOLUTION COMPUTER GRAPHICS

BACKGROUND OF THE INVENTION

1. Field of the invention

The present invention relates to computer graphics, and in particular, discloses apparatus that alleviates the need for large image stores.

2. Description of the related arts

High resolution full color graphics images require a massive amount of data. For an image the size of an A3 page, having a resolution of 400 dots per inch (dpi), approximately 96 MBytes are required. Such a memory size creates two problems. The first problem is the cost and time involved in the storage and transmission of 96 MBytes of data per image, and the second problem is the cost of 96 MBytes of semiconductor memory required for an image store that is necessary for generating and manipulating graphics images.

Some aspects of the prior art will now be described with reference to FIGS. 1A and 1B, and 2A and 2B.

FIG. 1A shows schematically a computer based graphics system 10 which has graphics commands arranged within a page display list (PDL) 1. The commands of the PDL 1 are high level commands that describe certain images to be created by the user such as DRAW CIRCLE or WRITE TEXT for example, the type of commands and language representation not being important for this illustration. When the graphics image is to be formed, the commands in the PDL 1 are interpreted 4 and the image is created sequentially on a pixel-by-pixel basis and stored in a full page memory 2. Once the entire image is stored in the memory 2 it can be printed by outputting 5 the stored data to a printer 3.

The formation of pixel image data from object based data is known in the art as rendering. As such, rendering opaque images involves writing pixel image data into memory. However, when images are transparent, it is necessary to composite. Compositing involves the combining of pixel images, generally by controlling the proportion of two or more source images in a destination or composited image. Accordingly, rendering transparent images involves compositing newly rendered objects with existing pixel image data.

The realization of FIG. 1B shows a full color graphics system 10 having an image store 6 having a capacity of 96 MBytes capable of storing a full color image for an A3 page. The image store 6 includes 1 byte of semiconductor memory for each of red, green, and blue (RGB) components for every pixel of the image. As seen in FIG. 1B, the size of an A3 page is 4,632×6,480 pixels for an image density of 400 dpi. The image store 6 is connected via a 24 bit RGB bus 8 to a system bus 7 which links the store 6 with a computer 11, a hard disk data storage unit 12 and a data transmission unit 13 for interconnection with other devices. The computer 11 performs calculations necessary to form the graphics image under the interpretation step 4 of FIG. 1A. The image store 6 is also connected to a converter 14 which converts RGB data into MCYK (magenta, cyan, yellow and black) data ready for reproduction preferably on a color laser printer 15 such as that included in the CANON (Registered Trade Mark) Color Laser Copier available from Canon KK of Japan. Reproduction on a video display (not shown illustrated) can also be readily achieved in a known manner.

The general arrangement of FIGS. 1A and 1B is currently cost effective for full color images of up to approximately 2 million pixels (6 MBytes). Pixel mapped image stores are also cost effective for binary images up to 32 million pixels, where only one bit per pixel is required, giving a total of 4 MBytes. However, for large color images, the memory requirement becomes excessive as seen in the 96 MBytes shown in FIG. 1. While this provides no particular technical problems, it is very expensive. The image store 6 is generally manufactured from semiconductor memories, generally being dynamic random access memory (DRAM) which costs approximately 0.5 millicents per bit (as of the date of this application). This represents almost $4,000 of direct component costs for the store 6 within the graphics system 10. In many systems, an image store of this size represents the single largest cost element.

Furthermore, the prior art system of FIG. 1B requires 96 MBytes of data storage for each image within the data storage unit 12, which is generally a hard disk drive. Also, 96 MBytes of information must be transferred from the storage device 12 to the image store 6 for each image to be printed on the printer 15. Also, the computer 11 must calculate 32 million pixels, each with 24 bits of information, in order to generate a single A3 image. The calculation of such images is inherently slow.

Suitable technology is currently available to alleviate the problem of massive file storage requirements for images. This technology is known as image compression, and in particular, Adaptive Discrete Cosine Transform (ADCT) compression. This technology can achieve compression ratios of 25:1 with negligible image quality loss on photographic images. Those skilled in the art will note that there is substantial quality loss with small point sized text. The use of ADCT compression reduces the data storage and transmission requirements from 96 MBytes for a 400 dpi A3 image to approximately 4 MBytes. The most suitable system currently available is for ADCT processing that was devised by the CCITT/ISO Joint Photographic Expert's Group (JPEG) based on Discrete Cosine Transform and Huffman encoding processes and published in ISO/IEO JTC1/SC2/WG8 JPEG Technical Specification Rev 5 Jan. 16, 1990. An ADCT processor system has been implemented in silicon by C-Cube Microsystems as the CL550B device.

FIGS. 2A and 2B show a graphics system 20, similar to that of FIG. 1, that uses ADCT compression for storage of images.

In FIG. 2A, a PDL 21 is provided in a manner similar to that of FIG. 1A. However, rather than directly calculating the image, the entire PDL 21 is compiled 24 to provide a display list 22 of low level commands. The image is realized by rendering 25. The display list 22 in bands into a strip buffer 23 whereby the image data stored in the strip buffer 23 represents a strip or band of the total image. As each strip is calculated (rendered) it can be printed directly by a printer 15 or compressed by a compressor 27 for storage in a (compressed) image memory 29. Data from the memory 29 can be expanded by an expander 28 for printing.

The graphics system 20 of FIG. 2B utilizes an ADCT processor 30 including compression and expansion functions connected to a compressed image store 31 having a capacity of 4 MBytes. A virtual image store 33 formed of a hard disk drive acts as a permanent store of a full image (96 MBytes).

The system 20 also includes a strip buffer 23 which is used to store a band of the image as it is calculated by the computer 11. The size of the strip buffer 23 is a compromise between cost and speed. A larger strip buffer is more expensive, but reduces the number of bands which must be calculated and therefore the time taken to calculate the image using conventional 2D object graphics techniques.

In operation, sections or bands of the image are calculated by the computer 11 and written into the strip buffer 23. This is achieved using object based display lists generally retained in the data storage 12 which are traversed for each band to be calculated. Such an operation is supported by many graphics systems, for example, in the Postscript language it can be achieved using the BANDDEVICE function.

When the strip buffer 23 is full, the calculated data is written into the virtual image store 33 or directly into the compressed image store 31 via the ADCT processor 30. This is repeated until the entire image is calculated. If the strip buffer 23 has a capacity of 1 MByte, and the image to be calculated comprises 96 MBytes, then 96 bands are required to be calculated.

Once the entire image has been calculated, if written onto the disk virtual image store 33, it is read from the store 33 and compressed by the ADCT processor 30 and written into the compressed image store 31.

When it is required to print any image, it is required to transfer the data from the virtual image store 33 to the compressed image store 31. The compressed image data is then read from the store 31 and decompressed by the ADCT processor 30. This is then output from the processor 30 to the converter 14 for printing by the printer engine 15. The CL550B ADCT processor device includes parallel MCYK outputs, and in some circumstances it is possible to omit the RGB to MCYK conversion and replace it with a simple data multiplexer.

In the system of FIG. 2B, the ADCT processor 30 is required because, when the entire image is stored in the virtual image store 33, which is a hard disk drive, it cannot be read rapidly enough to drive currently available color laser printers, such as the Canon CLC500. Such printers require 4 passes of color data (magenta, cyan, yellow and black) each of approximately 32 MBytes, at a data rate of 13.35 MBytes per second. If the data were to be stored on the disk in RGB format as indicated in FIG. 2B, then the data would have to be read from the disk four times at a rate of 40.05 MBytes per second (RGB at 13.35 MBytes per second each) and converted into MCYK. This needs to be done for every copy of every page to be printed. Such a data rate cannot be achieved using currently available cost effective hard disk drives. This problem is overcome using a complete image buffer, which in this case, is achieved using a compressed image store of 4 MBytes.

The graphics system 20 of FIG. 2 has serious limitations in image calculation speed. The image generation time cannot be less than the time taken to transfer the entire image into and out the virtual image store 33. Most currently available cost effective disk drives are limited to continuous transfer rates of less than 1 MByte per second. For 96 MBytes to be transferred into and out of an appropriately configured disk drive, a theoretical minimum time of 3.2 minutes is required. In practice, the time required to perform this function is much greater.

Another significant speed problem is the extra time taken to traverse the display list for each band (96 times in this case), rather than simply to draw each object. Also, page complexity is limited by the amount of display list memory (RAM within the computer 11).

As well as the above problems, the system of FIG. 2 does not remove the necessity to calculate every pixel of the image. For example, if 100 pixels can be calculated every millisecond, the time required to calculate 32 million pixels is at least 320 seconds. With other associated overheads, the time required to calculate a full color A3 page is generally more than 10 minutes.

SUMMARY OF THE INVENTION

It is an object of the present invention to substantially overcome, or ameliorate, the abovementioned problems through provision of a means by which full color graphics images can be stored and manipulated both quickly and cost effectively.

In accordance with one aspect of the present invention there is disclosed a graphics system comprising:

computer means connected to a bus, said computer means calculating at least one image from input data supplied via said bus;

a memory buffer connected to said bus for storing d portion of said one image as said portion is calculated; processor means connected to said memory buffer and an image store to (1) compress said portion when said memory buffer is full, the compressed portion being stored in said image store as compressed data, and (2) upon calculation of the next said portion and storing in said memory buffer, expanding the partial image from the image store into a compositor for combining with said next portion, the combined image being compressed into said image store.

Other features and advantages of the present invention will be apparent from the following description taken in conjunction with the accompanying drawings, in which like reference characters designate the same or similar parts throughout the figures thereof.

BRIEF DESCRIPTION OF THE INVENTION

FIGS. 7A and 7B show one method for calculating and rendering an image;

FIG. 8 shows an alternate method by which an image can be rendered;

FIG. 10 shows processing steps applicable when using multiple ADCT processors;

FIG. 11 is similar to FIG. 10 but shows additional input data;

FIGS. 13A and 13B illustrate the rendering and compositing of objects from separate display lists.

A number of preferred embodiments of the present invention will now be described with reference to the drawings.

DESCRIPTION OF THE PREFERRED EMBODIMENTS

Figure 2A:
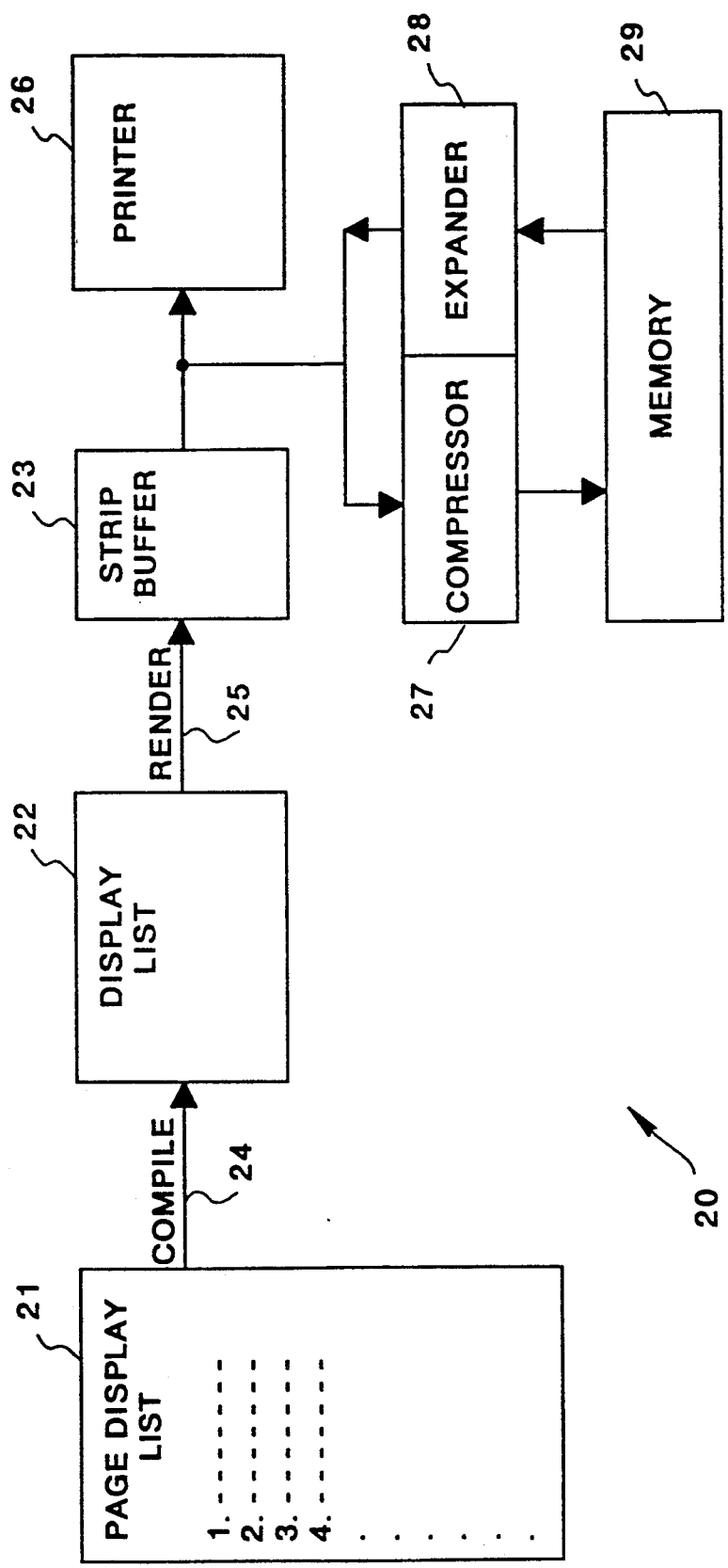
FIG. 2A is a block diagram of another prior art graphics system that utilizes a compressed image store.
Figure 2B:
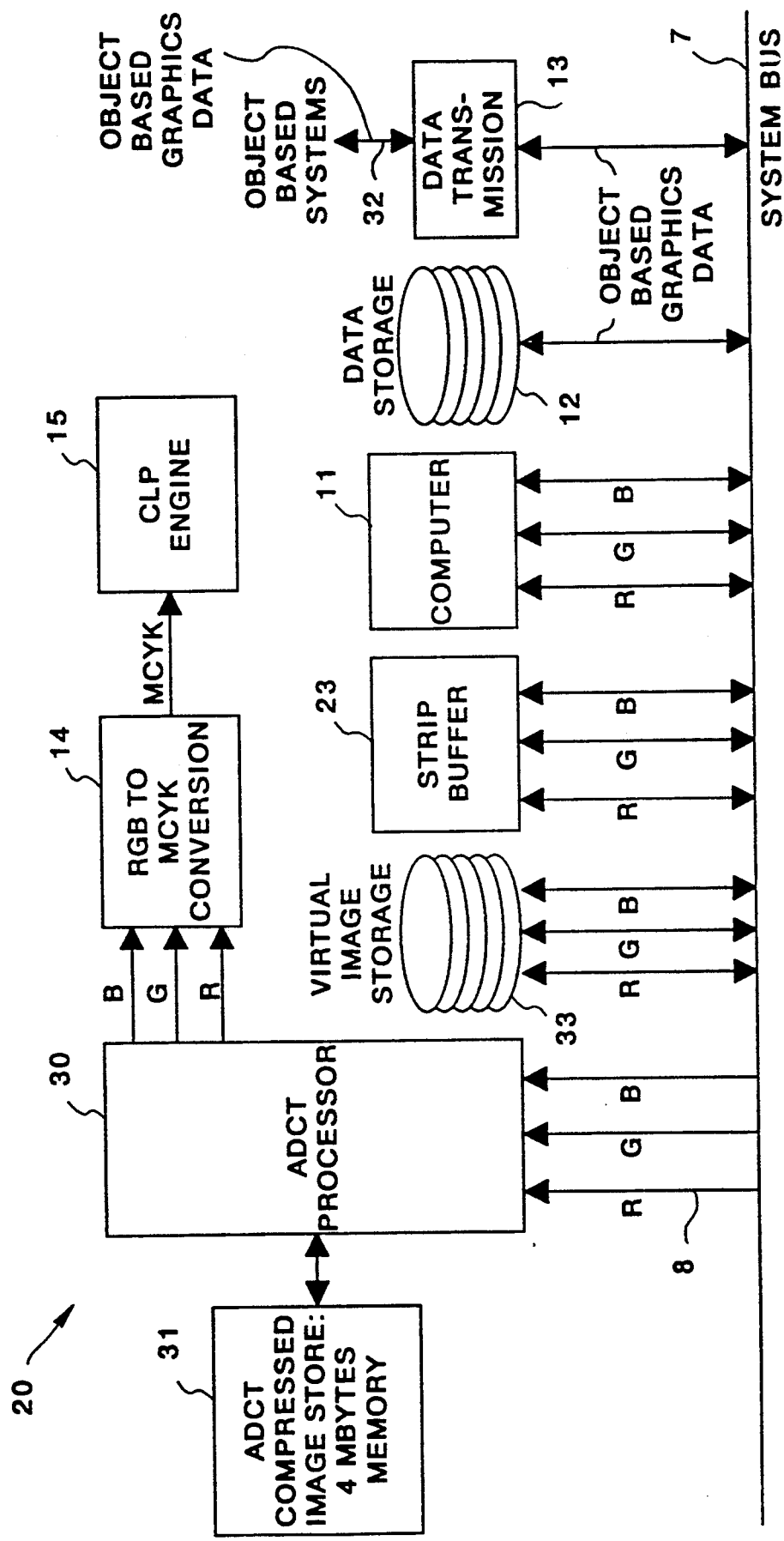
FIG. 2B is a schematic block diagram realization of FIG. 2A.

The problems associated with the virtual image store 33 of FIG. 2B can be avoided by omitting its presence and altering the data flow of pixel information as it is calculated by the computer 11. In this manner, as data is calculated by the computer 11 and temporarily stored in the strip buffer 23, data output from the strip buffer 23 is directly compressed and stored in the compressed image store 31.

Figure 3:
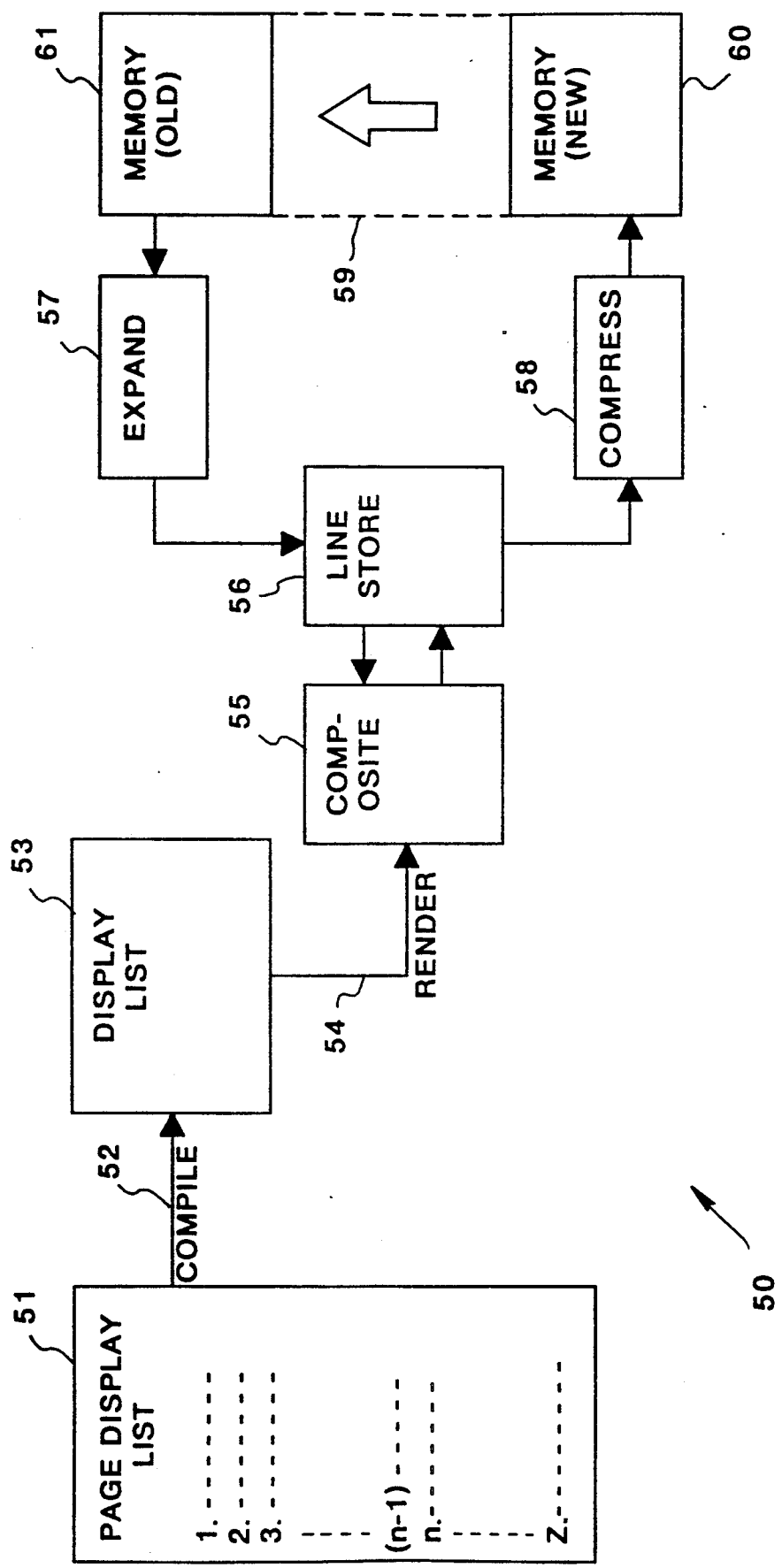
FIG. 3 is a schematic block diagram of a general arrangement.

Such an arrangement is shown in the graphics system 50 of FIG. 3 in which a PDL 51 has a series of high level commands 1 to z for example. The PDL 51 commands are compiled 52 into a display list 53 of limited size and the compilation stops when the display list 53 is full, in this case corresponding to a first set of commands a to (n−1) for example. When the display list 53 is full, its objects are rendered into a composite memory or compositor 55 (acting as the strip buffer 23 in FIG. 2), from where the data is passed through a composite line store 56 to a compressor 58 for storing in compressed memory 59. Once this is completed, the remaining second set of commands n to z of the PDL 51 can be compiled 52 into the display list 53.

The rendering of the objects in the first set of commands a to (n−1) results in the creation of a full image including only about one half of all the objects desired. So as to obtain correct placement of the new objects (n to z) with respect to the old (existing) objects (a to (n−1)) it is necessary to combine the objects at a pixel level as it is not possible to edit a compressed image directly.

The graphics system 50 processes data in strips or bands, (as will be later described), whereby as a new band of pixel data is rendered 54 into the composite memory 55, a corresponding band of the existing image is expanded 57 from the memory 55 into the line store 56. These two bands are then composited together in the composite memory 55 to generate one band of pixel image information including all objects (1 to z) from the PDL 51. The new band can then be compressed 58 and stored in the memory 59. In this manner the memory 59 can include portions of new image 60 as well as portions of old image 61.

The above processes are seen schematically in FIGS. 13A and 13B where FIG. 13A represents a full page image 300 including six objects such as a large triangle 301, a circle 302, a rectangle 303, another rectangle 304, a square 305 and a small triangle 306. FIG. 13A shows a plan view of the image in X-Y co-ordinates but, the image 300, although flat, can be considered in pseudo-cross-section as in FIG. 13B in X-Z co-ordinates where the objects 301-306 are shown layered relative to one another.

As seen in FIG. 13B, the first set of objects (301,303,305) are rendered onto a background directly from the display list. Rendering takes place in bands as previously discussed, of which only one band 310 is illustrated for clarity. Generally 810 bands are used for an A3 image. The objects 301, 303 and 305 are displaced "vertically" in this representation, as it is possible, as in the case of objects 303 and 305, for them to "overlap". When the second set of objects (302,304,306) are rendered, these overlay the first set and are combined therewith to create the entire image 300, at a pixel level.

Figure 4:
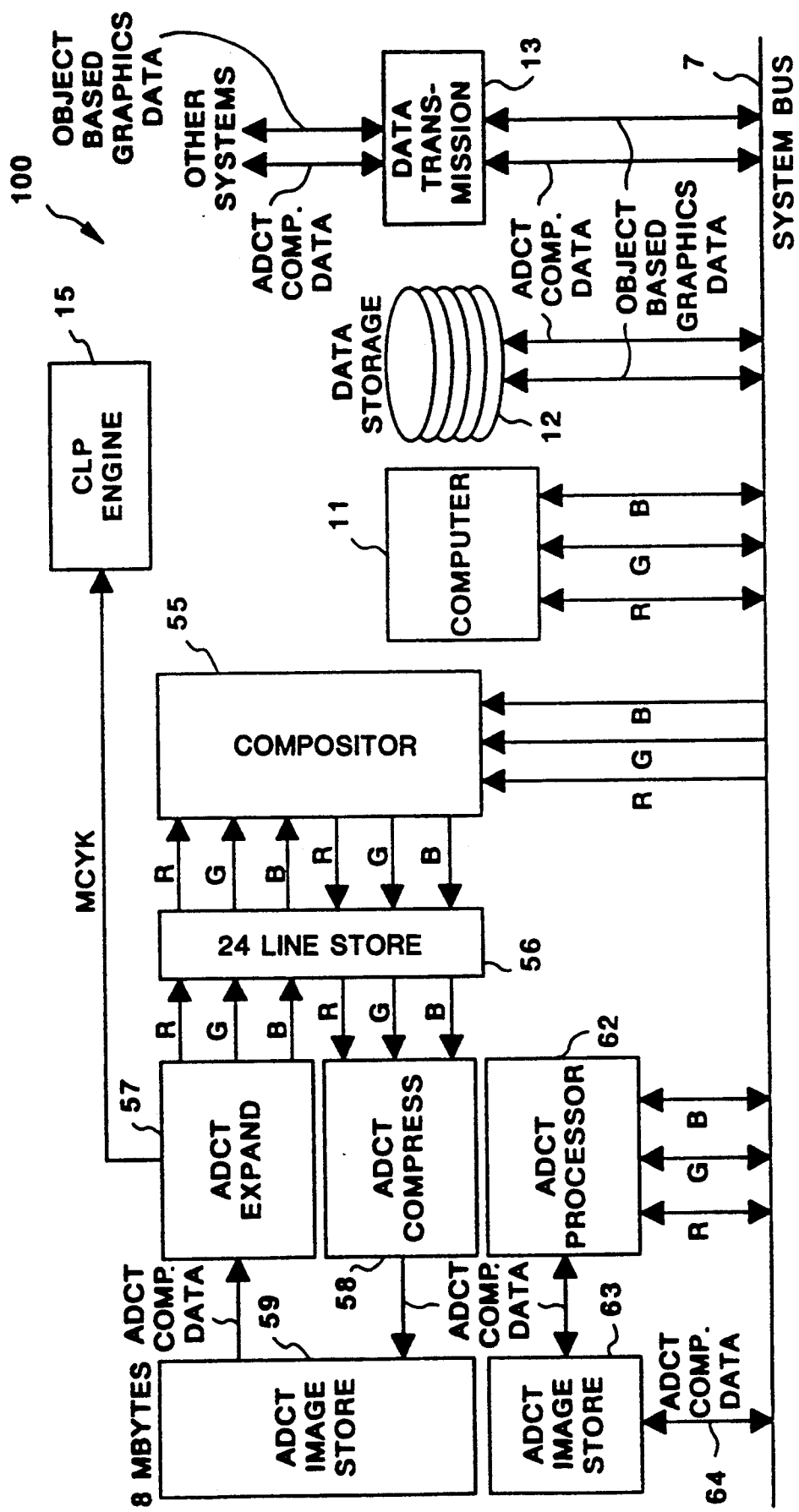
FIG. 4 is a schematic block diagram of a first preferred embodiment.

FIG. 4 shows one exemplary embodiment of a graphics system 100. The graphics system 100 includes a compositor 55 and a line store 56 which together replace and perform the function of the strip buffer 23 of FIG. 2B. The line store 56 preferably can store up to 24 lines each of 4,632 pixels (on an A3 page) and connects to ADCT units 57 and 58 which exclusively perform expansion and compression functions respectively. The ADCT units 57 and 58 connect to a compressed image store 59. An additional ADCT processor 62 connects to its own compressed image store 63 which provides a total of 8 MBytes of compressed image storage. This arrangement permits RGB data to be compressed or expanded directly onto the system bus 7 which also connects 64 to the compressed store 63 for the transfer of compressed images onto a hard disk 12 or to other systems via data transmission unit 13 together with object based data 32.

The ADCT units 57 and 58 provide a bi-directional coupling with the line store 56 and the compositor 55 which permit portions of the compressed image to be expanded into the compositor 55 and then modified by the computer 11. The modified portions can then be compressed and restored as compressed images in the store 59. This arrangement is used because it is extremely difficult to modify parts of an ADCT compressed image without first expanding it into pixels.

Such an arrangement is necessary for editing JPEG ADCT compressed data because that data is of variable length, in which all of the image up to the portion to be modified must be expanded and the entire image must be compressed again so as to reconstruct the image. The line store 56 is used so that as the image is expanded, it can be automatically buffered into and out of the compositor 55 until the portion required to be modified is identified. Those portions having already passed through the compositor are returned, via the ADCT compressor 58, to the image store 59. Once the selected portion has been modified, it can then be recompressed via the ADCT unit 58 and stored in the image store 59 whereby the remaining portion of the image is buffered out of the store 59 through the expander 57, and back through the compressor 58 via the compositor 55. As a result, the order of the ADCT compressed image is not upset by having to modify a particular portion of that image. This arrangement is practical as the time required to transfer the image is substantially less than the time required to recalculate and modify the portion under consideration.

The minimum size of the buffer formed by the line store 56 when using the JPEG ADCT compression system is a square array of 8×8 pixels. This is an inefficient format to calculate an image because many calculations are required to be repeated for each 8×8 pixel cell. Generally, the line store 56 contains 8 scan lines, allowing it to be filled by ADCT 8×8 pixels blocks and modified using scan line graphics algorithms.

The Canon CLC500 color laser copier useful as the print engine 5 in FIG. 4 has 4,632 pixels in a scanned line. In each compositing step, 579 blocks of 8×8 pixels are expanded, composited and compressed. In order that expansion, compositing and compression can occur simultaneously, three buffers are provided, an expansion 5 buffer, a compositing buffer and a compression buffer. The expansion and compression buffers are formed within the line store 56 and the compositing-buffer is formed within the compositor 55. These can all be implemented in the same block of memory so that data can be transferred from one buffer to the other merely by changing addresses. The total utilized memory size is therefore 3×579×8×8=111,168 pixels (44,672 bytes with 32 bit pixels). The compressed image stores 59 and 63 can be configured in a similar way.

Figure 5:
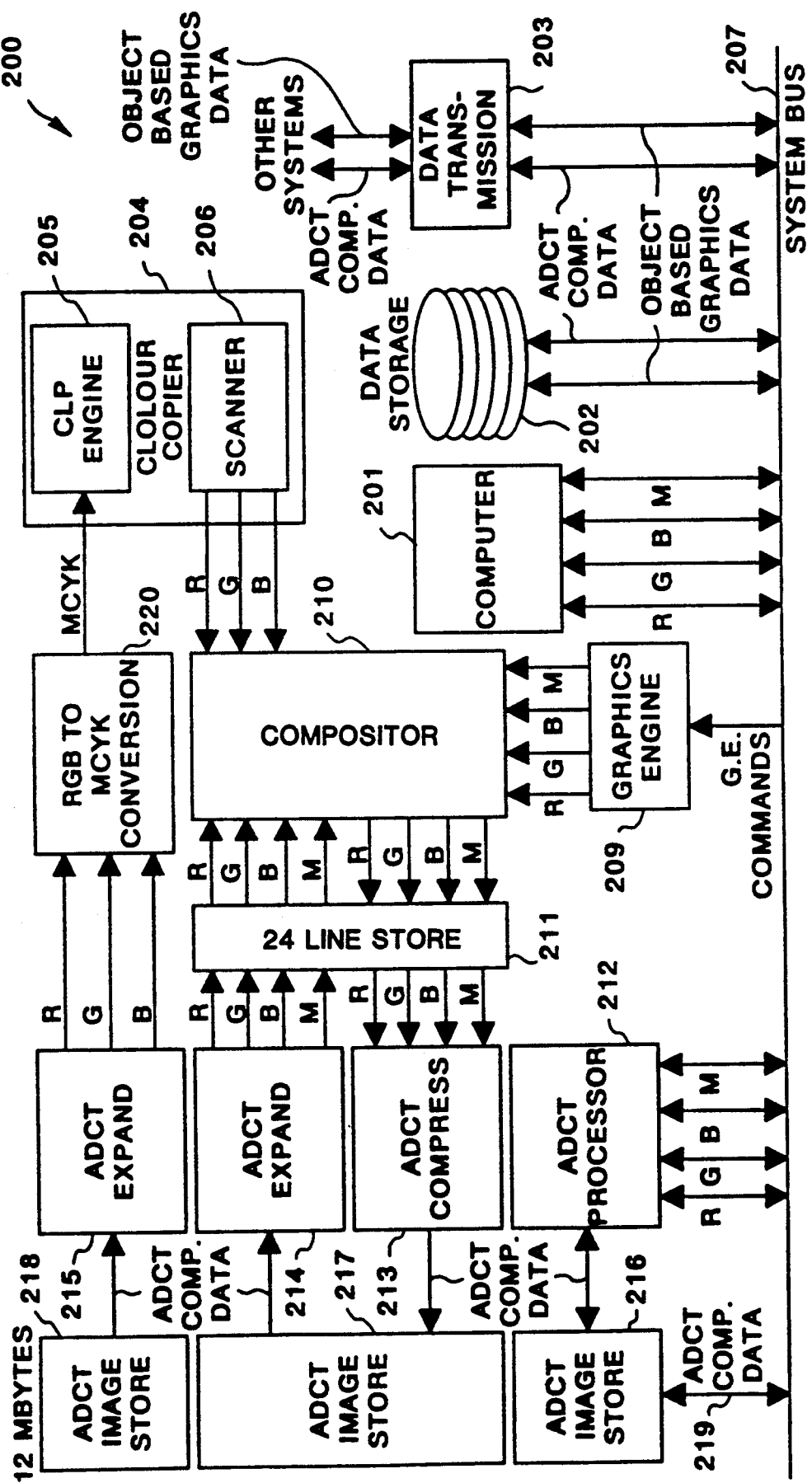
FIG. 5 is a schematic block diagram of a second preferred embodiment.

FIG. 5 shows a graphics system 200 which includes features additional to those of the system 100 of FIG. 4. Firstly, the color laser printer engine 15 has been included as an engine 205 within a color laser copier 204 such as the Canon CLC500. The copier 204 also includes a scanner 206 which outputs scanned RGB data that is input to a compositor 210.

The graphics system 200 also includes a graphics engine 209 such as that disclosed in Australian Patent Application Nos. PK1023 and PK3419. The graphics engine 209 permits object based images and text to be generated quickly. The graphics engine 209 expands graphic engine commands derived from a controlling computer 201 into pixel colors and transparencies, and composites these pixels into the line store 211. The graphics engine 209 provides direct support for black text, colored text, transparency, color runs, color blends, transparency blends, textures and direct color pixels from stored images.

Also, the graphics system 200 includes matte data transmitted in parallel with red, green and blue as RGBM 208. The addition of a matte plane to the stored image allows the transparency of scanned images and graphics which are to be composited with the image to be controlled by a matte. The JPEG standard does not specify mattes, however, the matte plane can be associated with the RGB data by compressing the matte in a second pass. This can be used directly for expanding and compressing the matte.

Apart from ADCT units 212, 213 and 214 and image stores 216 and 217, the graphics system 200 also has an additional ADCT expansion unit 215 with its own associated compressed image store 218. With this arrangement, data can be transferred from the store 218 for printing simultaneously with separate compositing operations using ADCT units 213 and 214 and the compositor 210. Such an arrangement reduces the time taken in image generation and printing of various images.

Each of the compressed image stores (216, 217, 218) can be implemented in a commonly addressable block of semiconductor memory. Accordingly, when the calculation of an image is completed, the ADCT image data can be transferred to the image store 218 for printing simply by altering the addresses of the ADCT processor accesses. This is because the data rates of the four ADCT processors (212, 213, 213, 215) operating simultaneously is low enough that the same physical block of memory can be used. The ADCT image must be expanded synchronously with the color laser printing process. Also, the data must be expanded four times for each copy of each page to be printed: once for each of magenta, cyan, yellow and black passes.

Figure 6:
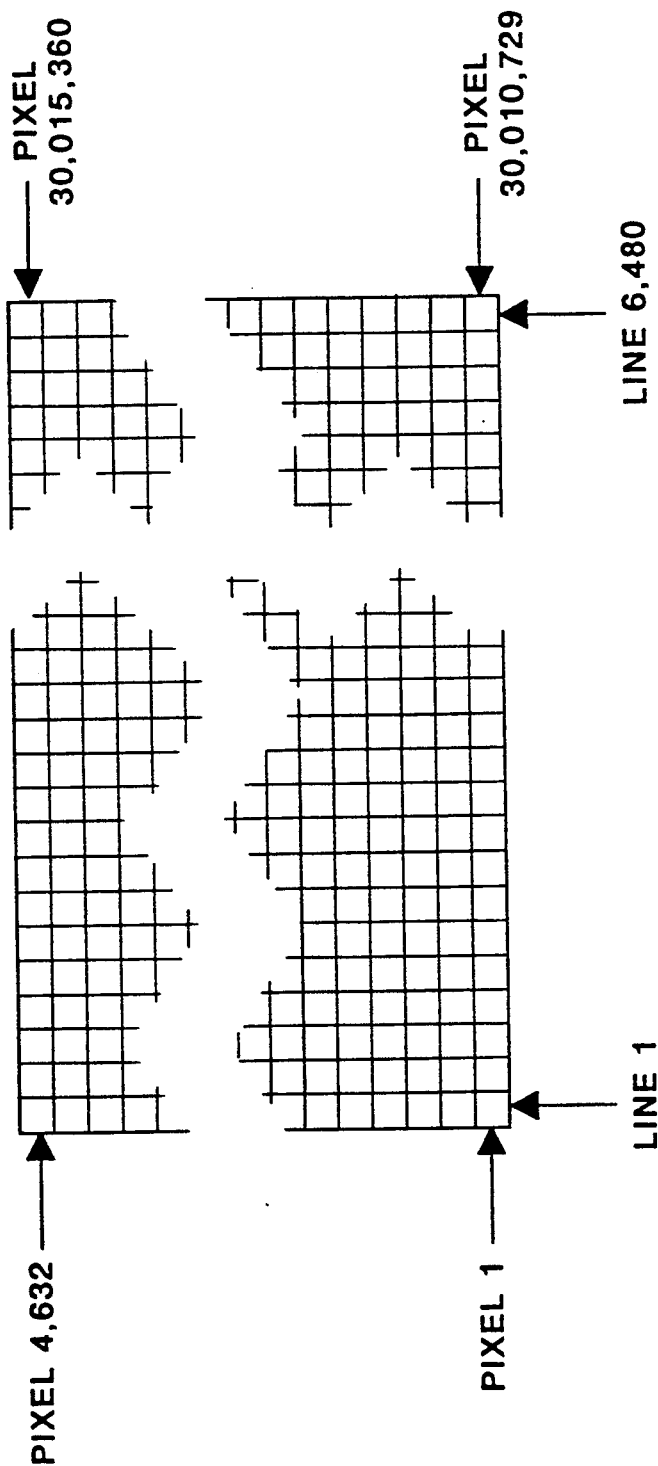
FIG. 6 illustrates the order in which the pixels of an A3 page are printed.

The use of an ADCT compressed image requires that the image must always be calculated in essentially the same order as the printer requires the output data for printing. The printing process used in the Canon color laser copier CLC500 is shown in FIG. 6 which prints pixels from the bottom left to the top right of an A3 page in landscape mode. This requirement for scan-line ordered image creation is different from usual methods of creating two dimensional object-based graphic images.

Most known systems, including most Postscript interpreters, use the "painter's algorithm" which achieves the effect of obscuring underlying objects simply by "writing over" them in a pixel mapped (or bit mapped for black and white) image store. In order to create the image shown in FIG. 7A, the image is written object by object into the image store, with each pixel of a new image replacing the pixel already present. This method is illustrated in FIG. 7B where the circular object is first formed and then overlaid with the triangle, the small square and the letter T.

Figure 1A:
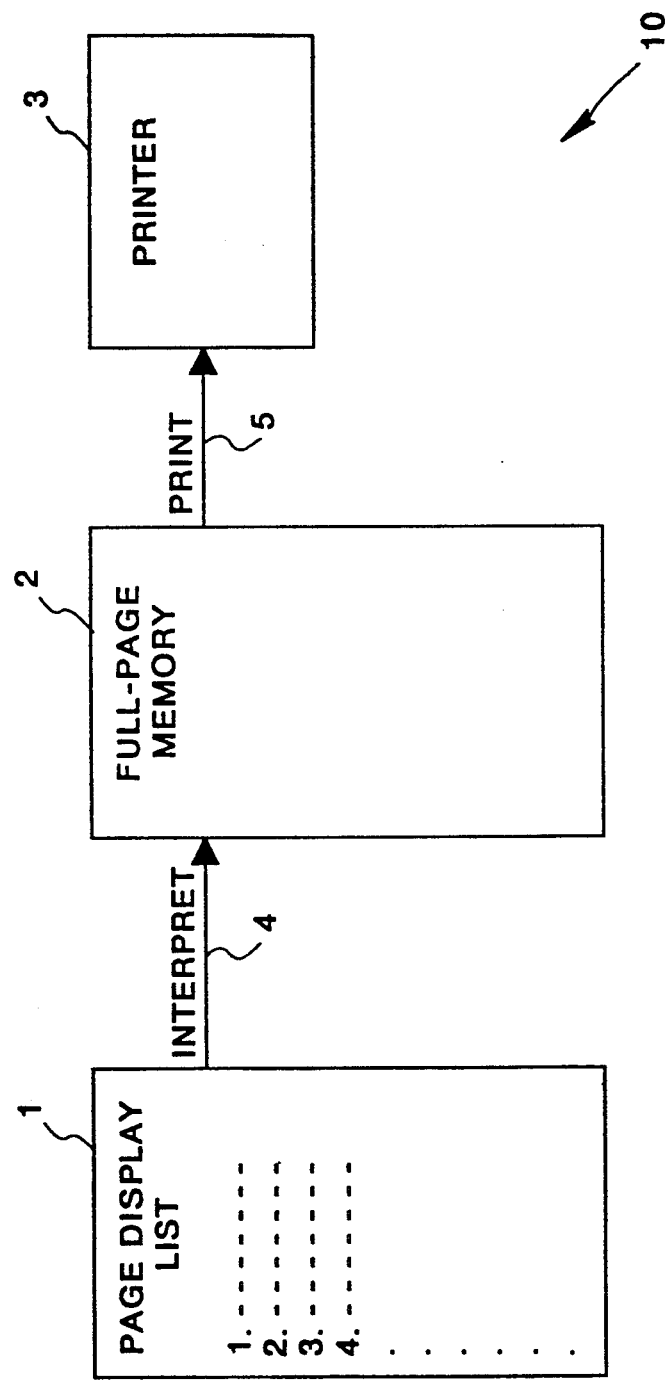
FIG. 1A is a block diagram of a first prior art graphics system including a full size semiconductor memory.
Figure 1B:
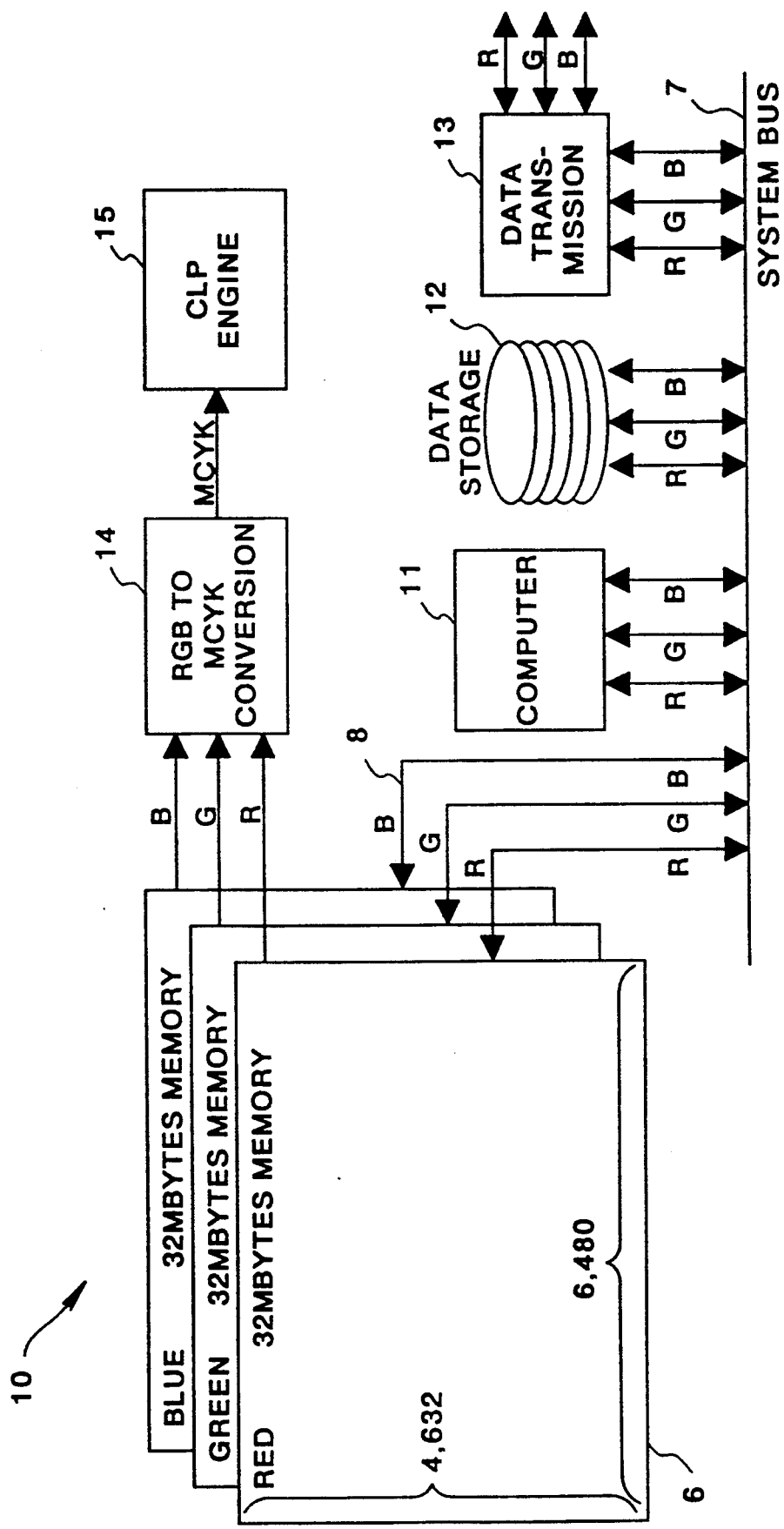
FIG. 1B is a schematic block diagram realization of FIG. 1A.

This method has the advantage of simplicity in that the image generation process need only consider each object in turn. This simplicity makes the method relatively simple to optimize speed. However, a complete pixel mapped image store is required, such as that shown in FIG. 1B. For full color A3 images at 400 dpi, again, 96 MBytes per page are required.

It is possible to create the same image by creating rectangular strips or bands. This is useful for systems which do not possess a full page memory, such as some laser printer and dot matrix printers. The concept of band rendering is shown in FIG. 8 which produces the same image formed in FIG. 7B.

This system has the disadvantage of complexity as all the objects must be stored, usually in a display list, and the appropriate band of each object must be created for each band. Accordingly, with reference to FIG. 8, in order to create each band, the various objects are divided into bands and the respective bands combined simultaneously. This is usually substantially slower than the painter's algorithm, as each object must be interpreted and clipped to each band.

Figure 9:
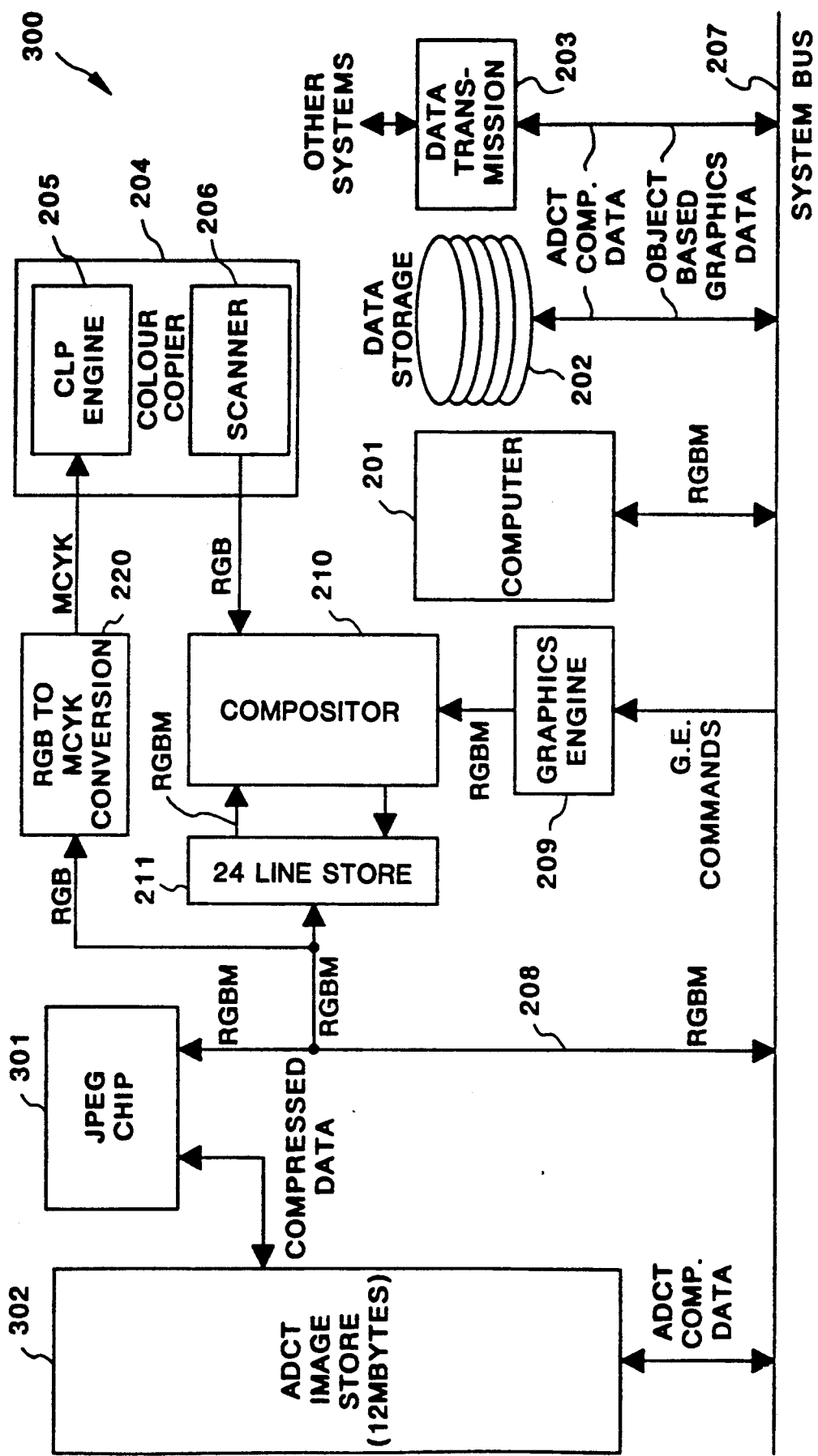
FIG. 9 is a schematic block diagram of an exemplary embodiment similar to FIG. 5 but including only a single ADCT processor.

The ADCT image compression system works on blocks of 8×8 pixels. An A3 image with 6,480 lines ×4,632/8 pixels contains 810×579 pixel blocks. The rendering system required for a compressed frame store system such as those of the preferred embodiment renders bands of 579 pixel blocks (8 vertical scan lines) in one pass. This rendering process must be repeated for 810 bands in order to render an entire A3 image. FIG. 9 shows a graphics system 300 similar to system 200 of FIG. 5 excepting that only a single ADCT processor comprising a JPEG chip 301 is used. This arrangement reduces the cost of the system and maintains versatility as it is possible to suspend operations of the JPEG Chip 301 essentially midstream, and perform other operations by switching control in a manner now to be described.

As previously indicated, the JPEG standard is based upon calculations that consider an 8×8 RBG pixel cell. Accordingly, for each cell, the following is obtained:

(A) $\begin{cases} (8 \times 8) \text{ Y (luminance)}, \\ \frac{1}{4}(8 \times 8) \text{ U (red - luminance), and} \\ \frac{1}{4}(8 \times 8) \text{ V (blue - luminance)} \end{cases}$ For every two of these sets, compressed data is derived in the following way:

(B) $\begin{cases} 2(8 \times 8)Y \rightarrow n_1x \text{ Huffman Codes and } 1 \times \text{DPCM DC component} \\ (8 \times 8)V \rightarrow n_2x \text{ Huffman Codes and } 1 \times \text{DPCM DC component} \\ (8 \times 8)U \rightarrow n_3x \text{ Huffman Codes and } 1 \times \text{DPCM DC component} \end{cases}$ where $1 \leq n_1, n_2, n_3 \leq 64$, where n is determined by the run length and a DPCM (differential pulse code modulation) DC component which is the predicted difference in the DC component of intensity between adjacent cells within a strip. For the first cell in an image, this is set to zero.

For each strip of 8 lines (i.e. cells), JPEG gives 290 sets of (B) above. JPEG provides that a marker be inserted at the end of the compressed image data string for organizational purposes such as indicating the end of a single print run.

However, the present inventor has chosen, in this embodiment, to force a situation, either in the JPEG chip 0 301, or in software for otherwise encoded images, to insert a marker code at the end of each strip.

This strip marker code is used to force the next DC component to be relative to zero (as with the first for the image) rather than a differential with respect to the previous DC component.

Such an arrangement permits the detection of image data on a strip-by-strip basis which thereby permits the context of the JPEG chip 301 (i.e. compression, expansion, file selection) to be changed within the processing of a single image.

Consider firstly FIG. 10 which illustrates processing using multiple ADCT processors. Each numbered square represents an image band (8 lines) for creating object graphics. Firstly, band 1 is expanded into the compositor. As band 1 is composited (processed by the computer), band 2 is simultaneously expanded into the line store. As band 2 is composited, band 3 is expanded and the composited (revised) band 1 is compressed.

FIG. 11 illustrates compositing a background image (BG) with a file image to give a new background. Firstly, in band 1 the background image is expanded from the compressed store into the line store and the file image is rendered to the composition. Next, band 1 of the background and file are composited together while band 2 for each is expanded and rendered respectively. Next, the composited band 1 is compressed for storage, band 2 composited and band 3 rendered, and so on.

Figure 12:
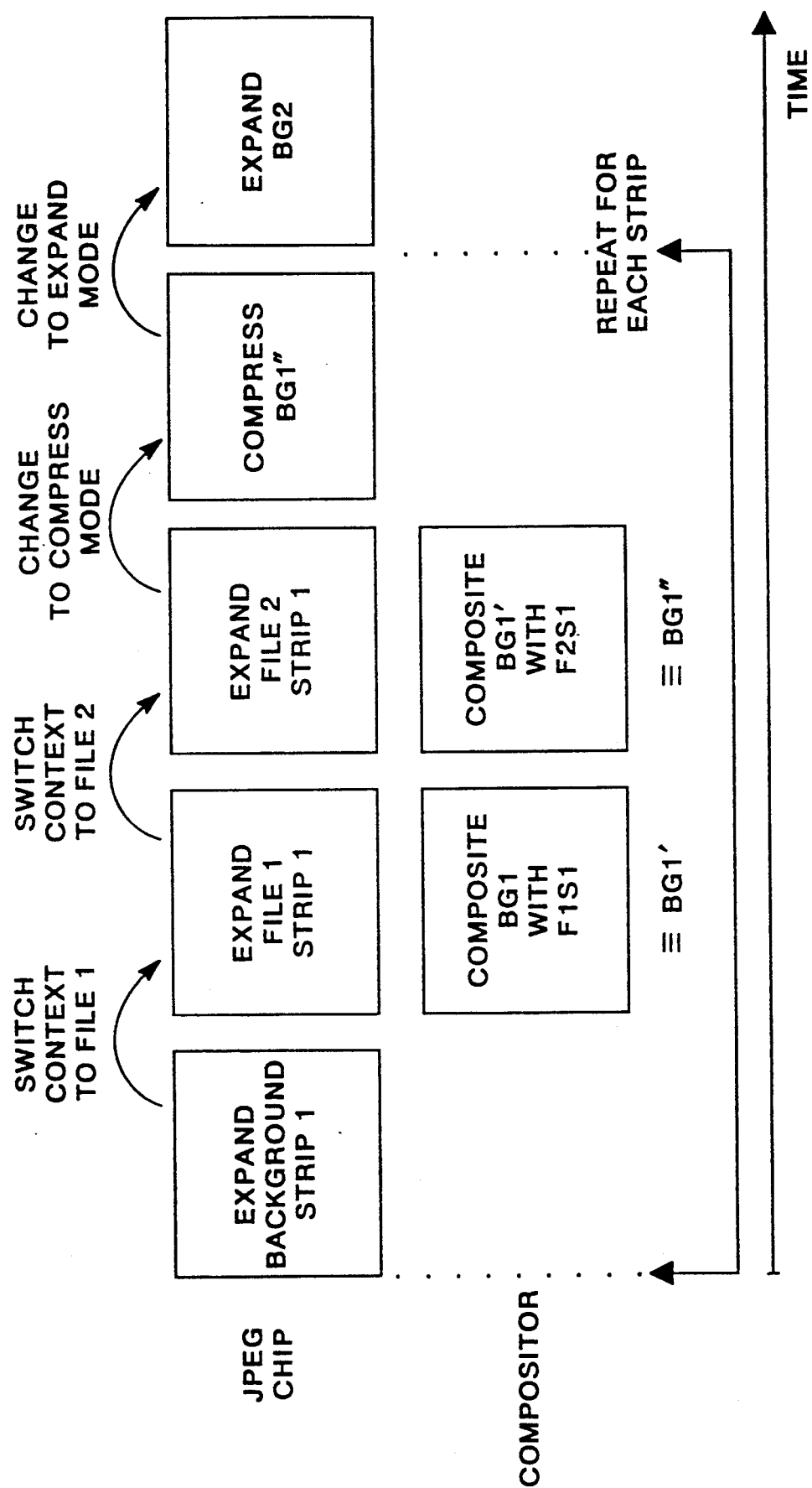
FIG. 12 shows processing of data with a single ADCT processor.

FIG. 12 however illustrates the process of FIG. 11 using two files but only a single ADCT processor such as the JPEG chip 301 of FIG. 9. Firstly the JPEG chip 301 expands a first band of the background (BG1) into the compositor. The JPEG chip 301 then switches context to extract a first band of a first file image (F1B1) from the bus and expand it into the compositor for combining with background band to give an initial first band composite background (BG1'). The JPEG chip 301 then switches context to a first band of a second file image (F2B1) and composites this with BG' to give BG1". The context is again changed to compress BG1" into the compressed store. The context changes again then to expand BG2, and so on.

Accordingly, the embodiment of FIG. 9 allows for having performed an expansion on an image and a file, those can be composited and then compressed on a strip-by-strip basis on a single chip thereby averting the additional expense of multiple ADCT JPEG processors.

The foregoing describes only a number of embodiments of the present inventions, and modifications, obvious to those skilled in the art can be made thereto without departing from the scope of the present invention.

For example, other compression techniques apart from the ADCT process can be used.

What is claimed is:

1. A graphics system comprising:
   computer means connected to a bus, said computer means calculating at least one image from input data supplied via said bus;
   a memory buffer connected to said bus for storing a portion of the at least one image as the portion is calculated; and
   processor means connected to said memory buffer and an image memory for
   (1) compressing the portion when said memory buffer is full, and then storing the compressed portion in said image memory as compressed data, and
   (2) upon calculation of a next portion of the one image and expanding a part of the compressed portion from the image memory for combining with the next portion, compressing the combined image and then storing the combined image into said image memory.

2. A graphics system as claimed in claim 1, wherein said memory buffer and said image memory comprise semiconductor memory.

3. A graphics system as claimed in claim 1, further comprising a permanent store connected via said bus, said permanent store providing a non-volatile store of data.

4. A graphics system as claimed in claim 1, further comprising an image reproduction means connected to said processor means for reproducing images stored in said image memory.

5. A graphics system as claimed in claim 4, wherein said image reproduction means comprises a video display.

6. A graphics system as claimed in claim 4, wherein said image reproduction means comprises a printer.

7. A graphics system according to claim 6, further comprising a scanner for scanning images and providing scanned image data to said memory buffer, wherein said image reproduction means and said scanner comprises a color laser copier.

8. A graphics system as claimed in claim 4, further comprising a data converter arranged at a data input of said image reproduction means for converting red, green and blue data into magenta, cyan, and yellow data and/or black data.

9. A graphics system as claimed in claim 4, further comprising a second image memory and a third image memory commonly addressable with said image memory and said second image memory for storing compressed image data outputtable to a further dedicated expander connected to said image reproduction means.

10. A graphics system as claimed in claim 9, further comprising a data converter arranged at a data input of said image reproduction means for converting red, green and blue data into magenta, cyan, and yellow data and/or black data.

11. A graphics system as claimed in claim 1, wherein image data having red, green and blue color components is calculated by said computer means and transmitted via said bus.

12. A graphics system as claimed in claim 1, further comprising a second said processor means connected to said bus and to a second image memory.

13. A graphics system as claimed in claim 12, wherein said second image memory is directly connected to said bus for transmission of compressed image data via said bus.

14. A graphics system as claimed in claim 1, wherein red, green and blue data is compressed and/or expanded simultaneously.

15. A graphics system as claimed in claim 14, wherein matte data is compressed and/or expanded either before or after red, green and blue data.

16. A graphics system as claimed in claim 1, wherein said processor means manipulates image data using adaptive discrete cosine transform methods to compress pixel data and to expand compressed pixel data.

17. A graphics system as claimed in claim 16, wherein said processor means operates in accordance with ISO/IEC JTC1/SC2/WG8 JPEG Technical Specifications.

18. A graphics system comprising:
computer means connected to a bus, said computer means calculating at least one image from input data supplied via said bus;
a memory buffer connected to said bus for storing a portion of the at least one image as the portion is calculated, said memory buffer comprising an expansion buffer, a compression buffer and a compositing buffer; and
processor means connected to said memory buffer and an image memory, said processor means including a dedicated compressor and a dedicated expander each connected to said image memory, the expander expanding compressed data from said image memory and transferring same into said expansion buffer, and said compressor compressing data from said compression buffer and transferring same into said image memory, the expansion and compression buffers respectively communicating data into and out of said compositing buffer, said compositing buffer also receiving data from said bus.

19. A graphics system as claimed in claim 18, further comprising a second said processor means connected to said bus and to a second image memory.

20. A graphics system as claimed in claim 19, wherein said second image memory is directly connected to said bus for transmission of compressed image data via said bus.

21. A graphics system as claimed in claim 18, further comprising a graphics engine interposed between said bus and said compositing buffer for manipulating image data received by said graphics engine.

22. A graphics system as claimed in claim 18, further comprising a scanner for scanning images and providing scanned image data to said compositing buffer.

23. A graphics system as claimed in claim 22, further comprising image reproduction means, wherein said image reproduction means and said scanner comprise a color laser copier.

24. A graphics system as claimed in claim 18, further comprising image reproduction means, wherein a single said processor means is interconnected to each of said image memory, said image reproduction means, said compression buffer, said expansion buffer and said bus, said single processor means being adapted to alter its operating context upon detection of the end of a band of an image being processed.

* * * * *

UNITED STATES PATENT AND TRADEMARK OFFICE
CERTIFICATE OF CORRECTION

PATENT NO. : 5,329,616
DATED : July 12, 1994
INVENTOR(S) : Kia SILVERBROOK

It is certified that error appears in the above-indentified patent and that said Letters Patent is hereby corrected as shown below:

COLUMN 1:

Line 6, "invention" should read --Invention--;
    Line 10, "related arts" should read --Related Art--.

COLUMN 2:

Line 57, "rendering 25. The" should read --rendering 25 the--.

COLUMN 4:

Line 27, "d" should read --a--;
    Line 68, "single" should read --single,--.

COLUMN 5:

Line 46, "bands," should read --bands--.

COLUMN 7:

Line 5, "5" should be deleted;
    Line 62, "(212, 213, 213, 215)" should read --(212, 213, 214, 215)--.

UNITED STATES PATENT AND TRADEMARK OFFICE
CERTIFICATE OF CORRECTION

PATENT NO. : 5,329,616  Page 2 of 2
DATED : July 12, 1994
INVENTOR(S) : Kia SILVERBROOK It is certified that error appears in the above-indentified patent and that said Letters Patent is hereby corrected as shown below:

COLUMN 8:

Line 9, "two dimensional" should read --two-dimensional--;
Line 32, "printer" should read --printers--;
Line 52, "FIG." should begin a new paragraph.

COLUMN 9:

Line 23, "chip 0 301," should read --chip 301,--.

COLUMN 10:

Line 49, "comprises" should read --comprise--.

Signed and Sealed this

Twenty-first Day of February, 1995

Attest:

BRUCE LEHMAN

Attesting Officer    Commissioner of Patents and Trademarks